Feb. 5, 1946.　　　T. D. CALLINAN　　　2,394,040
MINERAL PRODUCTS AND METHOD OF PREPARATION
Filed Sept. 3, 1943

Inventor:
Thomas D. Callinan,
by Harry E. Dunham
His Attorney.

Patented Feb. 5, 1946

2,394,040

UNITED STATES PATENT OFFICE 2,394,040

MINERAL PRODUCTS AND METHOD OF PREPARATION

Thomas D. Callinan, Pittsfield, Mass., assignor to General Electric Company, a corporation of New York Application September 3, 1943, Serial No. 501,182

6 Claims. (Cl. 117—126)

The present invention comprises a method of modifying hydrated mineral materials such, for example, as asbestos, whereby their structural properties and particularly their strength is increased. It comprises also new products derived from hydrated mineral materials and, in particular, improved sheet materials derived from asbestos or hydrated minerals such as clay, or a combination of asbestos and clay.

Many attempts have been made heretofore to substitute asbestos fiber for cellulose, silk, linen, ramie and other fibers in various textile products, particularly as insulation in the electrical field. The non-combustible and heat-resisting properties of asbestos are especially desirable in this field. The semi-conducting characteristic of asbestos and its lacks of wet strength, however, have prevented widespread use. By "wet strength" I mean to refer to the strength of the material, for example a sheet product, which is wetted by a liquid.

In an effort to overcome these drawbacks, asbestos products have been impregnated with various organic varnishes. Although some advantage thus is gained, the heat-resisting character of the products is sacrificed. If such products are subjected to even moderately high temperatures during use, the resulting decomposition of the organic impregnant, even if only partial, leaves a depreciated residue which may be worse than no solid insulation whatever.

The lack of wet strength of hydrous minerals, such as asbestos, also has been a drawback to their use in making sheet products. Even in the course of varnish impregnation lack of wet strength may cause tearing and other damage.

Hydrated mineral materials are treated in accordance with my invention with a suitable halide of silicon or titanium, thereby causing chemical interaction to occur with the production of a product having new and improved properties. For example, asbestos sheet material may be treated with a halide of silicon or titanium which enters into chemical combination, as will be explained, producing new compounds of higher molecular weight and improved tear strength than the original asbestos. Other hydrous mineral materials, for example, bentonite, kaolin and ball clays, may be similarly reacted.

Figure 1:
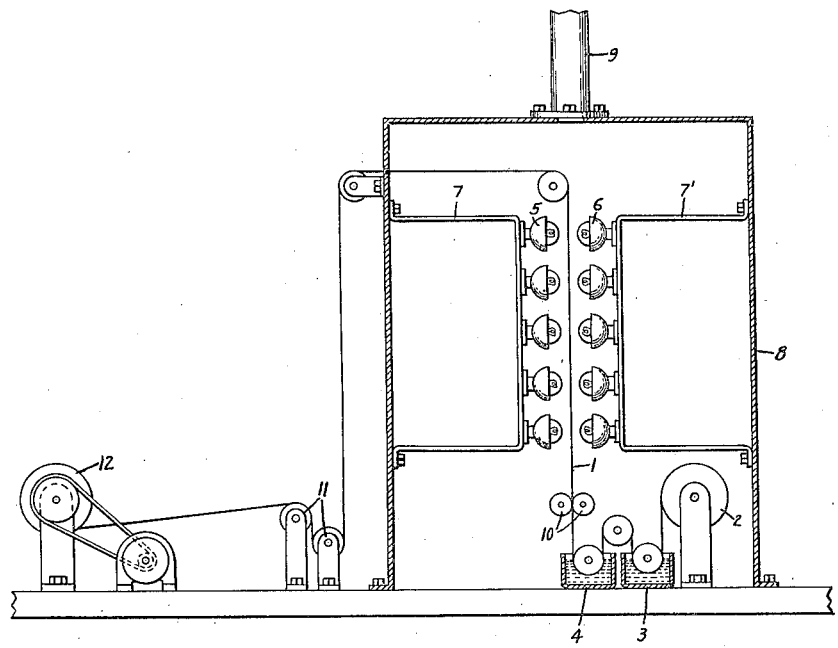
Figure 2:
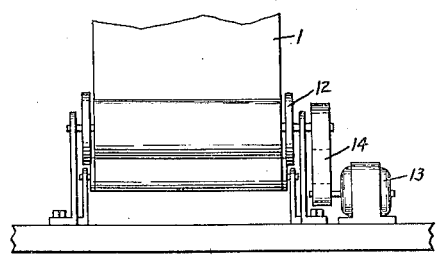

The accompanying drawing somewhat diagrammatically illustrates an apparatus suitable for carrying out my invention. Fig. 1 being a vertical section and Fig. 2 a side elevation of the take-up reel.

In carrying out my invention one may proceed in any convenient way to bring about this type of reaction. Asbestos first may be fabricated into sheet form by known methods. Referring to the drawing, a strip 1 of asbestos sheet to be treated is led from a reel 2 successively through receptacles 3 and 4, suitable guides being provided. The receptacle 3 contains an impregnating liquid (e. g., $SiCl_4$) and the receptacle 4 contains a washing liquid. The washing liquid may consist of water or an alkaline aqueous solution, for example, a solution of an amine, ammonia, sodium hydroxide or magnesia.

The sheet material 1 is led through a drying and heat-treating apparatus. The latter may consist of oppositely positioned banks 5, 6 of infra-red lamps or other suitable heaters. The latter are supported on frameworks 7, 7' attached to the side walls of a housing 8 surrounding the described apparatus. The temperature of the heating zone may be widely varied and may be within the limits of 100 to 300° C. Fumes and water vapor escape through a vent pipe 9. Excess liquid impregnant or washing liquid may be removed by the squeegee rollers 10. The rollers 10 and the washing liquid are not strictly essential and hence may be omitted, the impregnated strip being led directly into a drying device.

The treated product emerging from the chamber 8 is conducted over guides 11 to a take-up reel 12. As better shown in Fig. 2, the sheet product 1 is wound upon the reel 12. A motor 13 is suitably connected to the reel 12 by a belt 14. The treating liquid may consist of a tetrachlor compound of silicon or titanium.

Not only may asbestos products be improved by treatment with such compound, but also materials of the kaolin and bentonite class may be thus treated. For example, a sheet product may be prepared from bentonite, preferably in association with asbestos fibers or glass fibers. The fabrication of such a product is described in a copending U. S. application Serial No. 370,807, filed December 19, 1940 by Theodore R. Walters.

It is possible also to make a sheet material from bentonite without the association of a filler or fibrous material. Such sheet material then is treated with a chloride of silicon or titanium.

The tensile strength of asbestos paper made in the ordinary way is increased nearly threefold by treatment in accordance with my invention. By such chemical interaction the tensile strength of asbestos sheet products containing bentonite clay has been increased as much as fourteenfold. Hydrous mineral products of a stony characteristic may be improved in physical properties by such treatment.

Sheet products also have a substantially greater wet strength imparted thereto by this treatment. Electrical properties are substantially improved. The thermal stability of the treated products is improved. Such materials have resisted ambient temperatures of about 175° C. for periods of many months without loss of tensile strength.

Although I do not wish to be restricted by a theoretical explanation of the chemical reactions which are involved, I believe that the chosen metal chloride reacts with a hydrated mineral to yield an inorganic polymer, that is, the chlorine atoms react with the hydroxyl groups of the mineral setting free hydrogen chloride and causing molecular inter-linkage as will be explained.

Although from conceptions resulting from a study of X-ray diffraction patterns the molecular structure of a silicate, such as asbestos, may be explained on a polydimensional basis, it will suffice for the present purposes to assume an atomic system in a single plane.

For the present purposes asbestos may be represented as having the following structure:

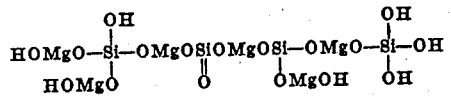

The essential part of the molecule may be written as follows:

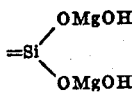

A reaction of a mineral containing such hydrated group may be diagrammatically represented as follows:

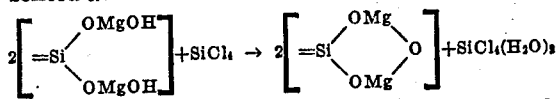

Next these two groups inter-link, being joined by silicon as follows:

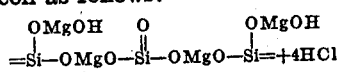

The inter-linkage of silicon (or titanium, as the case may be) with the molecules of asbestos or like hydrous mineral is indicated by the following observed facts. An improved tear strength of the material appears to indicate an increase of chain length. An observed increase in density indicates an increase in molecular weight. The treated product is more porous than the untreated product, indicating that silicon dioxide is not deposited in situ, but instead a fundamental transformation of the compound occurs. The fact that the increase in strength is observable even when asbestos dried under severe drying conditions is treated with a metal halide, indicates that the metal halide is not merely reacting with water adsorbed on the fibers of the asbestos.

The improvement in physical properties produced in an asbestos product by my invention will be noted from the following comparison:

| | Untreated | Treated |
|---|---|---|
| Thickness | 3.0 | 3.0 |
| Tensile strength | 700 | 1,900 |
| Density | 0.57 | 0.63 |
| Air resistance (cc/15 secs.) | 21 | 24 |
| Bursting strength | 7 | 8 |
| Elmendorf tear strength | 5 | 7 |
| Fold test | 2 | 3 |
| Dielectric strength | 260 | 300 |

The treated stock is capable of being varnished, impregnated, glazed, or otherwise treated, in accordance with well known practices.

In some cases hydrous minerals, such as clay and asbestos, may be treated with a chlorine compound of silicon or titanium before being fabricated into sheet material. Asbestos fiber may be treated with an excess of silicon tetrachloride, for example, by dipping the fibers into a chloride of silicon or titanium, or into a solution of such reagent in a suitable solvent such as carbon tetrachloride. Upon removal, the fibers are dried in an air oven at a temperature in a range of about 100 to 200° C. A metathetical reaction occurs as above described whereby the fibers are toughened and improved in wet strength. These treated fibers are dispersed in water by means of a paper beater. One hundred and fifty parts by weight of asbestos fiber treated with silicon tetrachloride and 150 parts by weight of a 20 per cent aqueous dispersion of bentonite were mixed and sufficient water was added to result in a suspension containing 0.72 part of solid to the cubic liter of water. To this aqueous suspension were added 15 parts of a 7.5 per cent solution of copper acetate which causes flocculation of the bentonite and concomitant deposition of the bentonite on the asbestos fiber. Sheet material was prepared according to established technique in a paper-making machine.

A similar sheet material was prepared from untreated asbestos fiber utilizing the same paper-making technique. It was found that the sheet product made from asbestos fiber modified as herein described possessed a tensile strength over fivefold greater than the untreated stock. The treated material had a density about one-third of the density of the untreated material. The air resistance of the treated material was about one-half that of the untreated material.

The metathetical reaction herein described may be carried out in the gaseous phase. For example, asbestos may be subjected to the vapor of silicon tetrachloride or titanium tetrachloride. Its physical properties, including wet strength and dielectric strength, will be improved.

What I claim as new and desire to secure by Letters Patent of the United States is:

1. The step in a method of modifying a hydrated silicate which consists in subjecting said silicate to contact with a chloride of an element chosen from the group consisting of silicon and titanium whereby chemical reaction occurs accompanied by the production of a mineral product of higher molecular weight combined with the chosen element.

2. The step in a method of modifying asbestos fibers which consists in subjecting said fibers to contact with a chloride of silicon.

3. The method of improving the tensile strength of sheet material comprising hydrated silicate composition which consists in bringing into contact said composition and a chloride of an element chosen from the group consisting of silicon and titanium, and removing the by-products of the resulting reaction.

4. The method of improving the tensile strength of sheet material comprising hydrated silicate composition which consists in bringing said sheet material into contact with silicon tetrachloride, thereby causing chemical reaction to occur between said silicate composition and said chloride, treating with water to remove hydrogen halide and drying.

5. A sheet material comprising the reaction product of a hydrous silicate and a chloride of a metal chosen from the group consisting of silicon and titanium, said product having greater tensile strength than untreated but otherwise similar material.

6. As asbestos-like fiber composition formed as a result of chemical interaction of asbestos and silicon tetrachloride and having a higher silicon content and greater tensile strength than similar but untreated asbestos.

THOMAS D. CALLINAN.